(12) United States Patent
Kusuda

(10) Patent No.: US 10,569,336 B2
(45) Date of Patent: Feb. 25, 2020

(54) CUTTING INSERT, CUTTING TOOL, AND METHOD OF MANUFACTURING MACHINED PRODUCT

(71) Applicant: Kyocera Corporation, Kyoto-shi, Kyoto (JP)

(72) Inventor: Yukihiro Kusuda, Yasu (JP)

(73) Assignee: Kyocera Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 15/757,671

(22) PCT Filed: Sep. 7, 2016

(86) PCT No.: PCT/JP2016/076284
§ 371 (c)(1),
(2) Date: Mar. 6, 2018

(87) PCT Pub. No.: WO2017/043520
PCT Pub. Date: Mar. 16, 2017

(65) Prior Publication Data
US 2019/0022762 A1    Jan. 24, 2019

(30) Foreign Application Priority Data

Sep. 7, 2015 (JP) .................... 2015-175802

(51) Int. Cl.
*B23B 27/00* (2006.01)
*B23B 27/04* (2006.01)

(52) U.S. Cl.
CPC .......... *B23B 27/045* (2013.01); *B23B 27/007* (2013.01); *B23B 2200/0471* (2013.01)

(58) Field of Classification Search
CPC . B23B 27/045; B23B 27/05; B23B 2200/081; B23B 2200/321; B23B 2200/085; B23B 2200/205
See application file for complete search history.

(56) References Cited

U.S. PATENT DOCUMENTS 5,676,495 A * 10/1997 Katbi .................... B23B 27/045
407/114
8,784,014 B2 * 7/2014 Onodera ............... B23B 27/045
407/114
(Continued)

FOREIGN PATENT DOCUMENTS

JP    2005288613 A  * 10/2005
JP    2011098427 A    5/2011
(Continued)

OTHER PUBLICATIONS

International Search Report received for International Application No. PCT/JP2016/076284 dated Oct. 11, 2016, 2 pages.

*Primary Examiner* — Alan Snyder
*Assistant Examiner* — Willmon Fridie, Jr.
(74) *Attorney, Agent, or Firm* — Viering, Jentschura & Partner MBB

(57) ABSTRACT

In an embodiment, a cutting insert includes an upper surface, a front end surface, and a front cutting edge. The upper surface includes a first protrusion and a second protrusion, and a first surface, a second surface, and a third surface, each of which is located between the first protrusion and the second protrusion. The first surface is inclined downward at a first inclination angle. The second surface is inclined upward at a second inclination angle. The third surface is inclined upward at a third inclination angle. The second surface is located lower than an upper end of each of the first protrusion and the second protrusion. The third surface extends further upward than the upper end of each of the first protrusion and the second protrusion. The third inclination angle is smaller than the second inclination angle.

20 Claims, 18 Drawing Sheets

(56) References Cited

U.S. PATENT DOCUMENTS

| 9,272,336 B2* | 3/2016 | Inoue | B23B 27/045 |
| 9,925,595 B2* | 3/2018 | Tsuda | B23B 27/045 |
| 2005/0123367 A1* | 6/2005 | Gati | B23B 27/005 |
| | | | 407/113 |
| 2012/0210834 A1 | 8/2012 | Onodera | |
| 2013/0183109 A1 | 7/2013 | Fujii | |
| 2013/0192431 A1 | 8/2013 | Inoue | |
| 2015/0158088 A1 | 6/2015 | Inoue | |

FOREIGN PATENT DOCUMENTS

| JP | 2014161996 A | 9/2014 |
| WO | 2011052667 A1 | 5/2011 |
| WO | 2011149091 A1 | 12/2011 |
| WO | 2012043629 A1 | 4/2012 |
| WO | 2014017623 A1 | 1/2014 |

* cited by examiner

CUTTING INSERT, CUTTING TOOL, AND METHOD OF MANUFACTURING MACHINED PRODUCT

RELATED APPLICATIONS

The present application is a national stage entry according to 35 U.S.C. § 371 of PCT application No.: PCT/JP2016/076284 filed on Sep. 7, 2016, which claims priority from Japanese application No.: 2015-175802 filed on Sep. 7, 2015 and is incorporated herein by reference in its entirety.

TECHNICAL FIELD

The present embodiment relates to a cutting insert, a cutting tool, and a method of manufacturing a machined product.

BACKGROUND ART

As a cutting insert for use in a cutting process of a workpiece, such as metals, different cutting inserts have been known. For example, a cutting insert as described in Patent Document 1 has been known as a cutting insert for use in a grooving process. A rake surface (upper surface) is provided with a first recess and a second recess in the cutting insert described in Patent Document 1. These recesses have a concave curved surface shape.

RELATED ART DOCUMENTS

Patent Document

Patent Document 1: Japanese Unexamined Patent Publication No. 2011-98427

SUMMARY

In an embodiment, a cutting insert includes an upper surface, a front end surface adjacent to the upper surface, and a front cutting edge located at an intersection part of the upper surface and the front end surface. The upper surface includes a first protrusion and a second protrusion respectively extending in a direction orthogonal to the front cutting edge in a top view. The upper surface also includes a first surface, a second surface, and a third surface, each of which is located between the first protrusion and the second protrusion in a direction along the cutting edge in a top view. The first surface is located along the front cutting edge and inclined downward at a first inclination angle as going away from the front cutting edge. The second surface is a flat surface located further rearward than the first surface, and is inclined upward at a second inclination angle as going away from the front cutting edge. The third surface is a flat surface located further rearward than the second surface, and is inclined upward at a third inclination angle as going away from the front cutting edge. The second surface is located lower than an upper end of each of the first protrusion and the second protrusion. The third surface extends further upward than the upper end of each of the first protrusion and the second protrusion. The third inclination angle is smaller than the second inclination angle.

EMBODIMENTS

<Cutting Insert>

Figure 1:
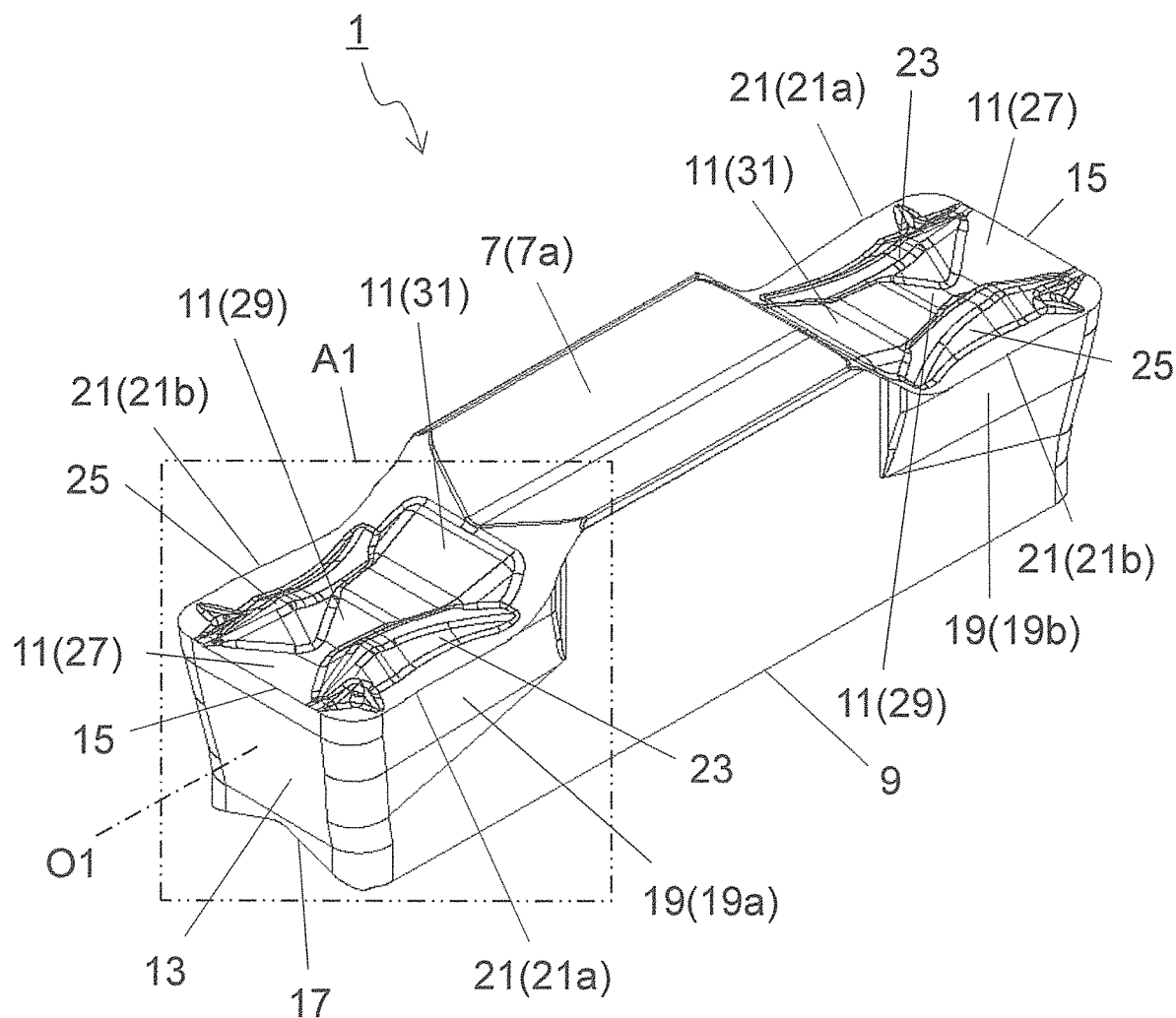
FIG. 1 is a perspective view illustrating a cutting insert in one embodiment of the present disclosure.

A cutting insert in an embodiment is described in detail below with reference to the drawings. For the sake of description, the drawings referred to in the following illustrate, in a simplified form, only main members necessary for describing embodiments. The cutting insert of the present disclosure is therefore capable of including any arbitrary structural member not illustrated in the drawings referred to. Sizes of the members in each of the drawings are not ones which faithfully represent actual structural members and size ratios of these members. In the following, a side at which a front end surface 13 is located is referred to as a front end side, and a side located opposite to the front end surface 13 is referred to as a rear end side.

Figure 3:
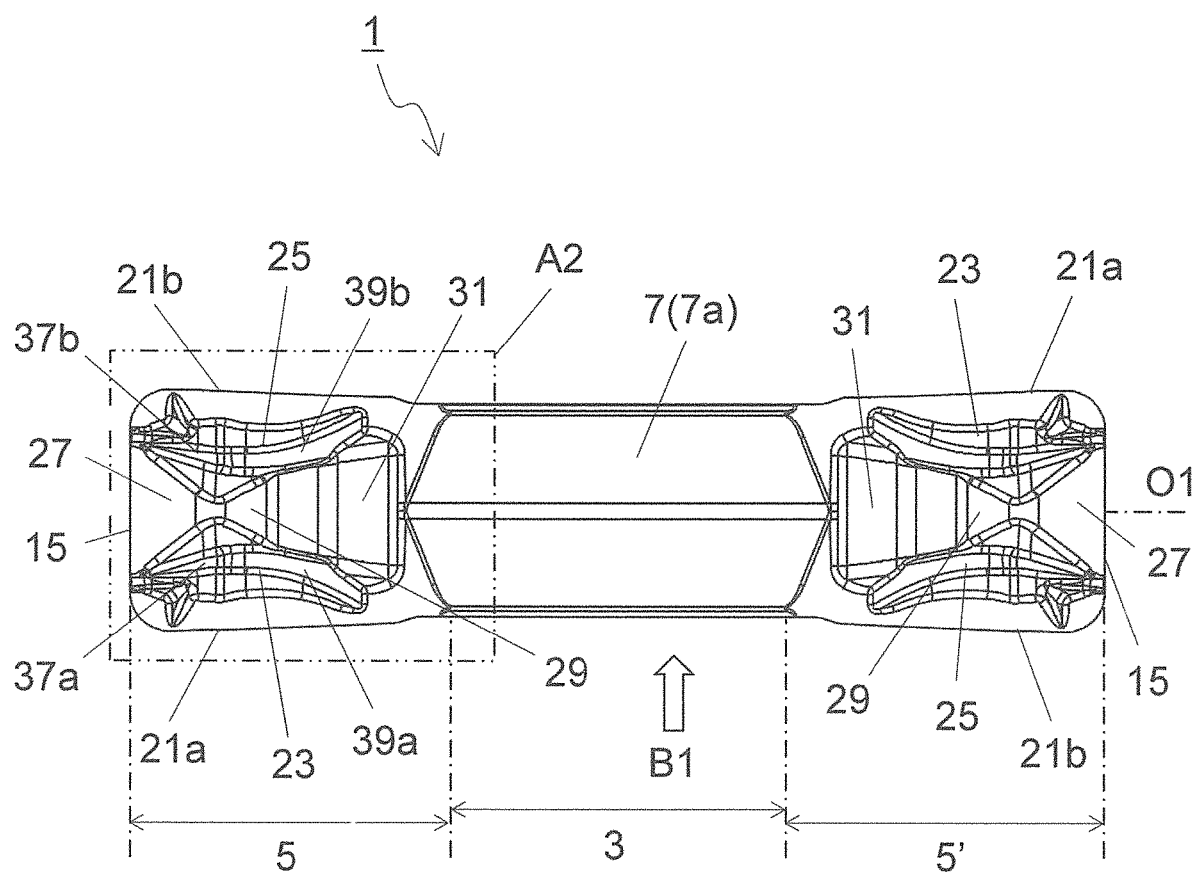
FIG. 3 is a top view of the cutting insert illustrated in FIG. 1.

The cutting insert 1 (hereinafter also referred to simply as the insert 1) in the present embodiment has, as illustrated in FIG. 1, a bar shape extending along a central axis O1 and from the front end side (a lower left side in the drawing) to the rear end side (an upper right side in the drawing). The insert 1 includes a main body 3 and two cutting parts 5 as illustrated in FIG. 3. The main body 3 is a member designed to be fixed to a holder when attaching the insert 1 to the holder. The main body 3 has a bar shape and extends along the central axis O1. Specifically, the main body 3 in the present embodiment has an approximately quadrangular prism shape extending along the central axis O1.

The main body 3 includes an upper side surface 7 which is located on an upper side and brought into contact with the holder, and a lower side surface 9 which is located on a lower side and brought into contact with the holder. The upper side surface 7 includes an upper side groove 7a extending in a direction along the central axis O1. Similarly, the lower side surface 9 includes a lower side groove 9a extending in a direction along the central axis O1. The insert 1 is stably fixable to the holder by including the upper side groove 7a and the lower side groove 9a.

Figure 5:
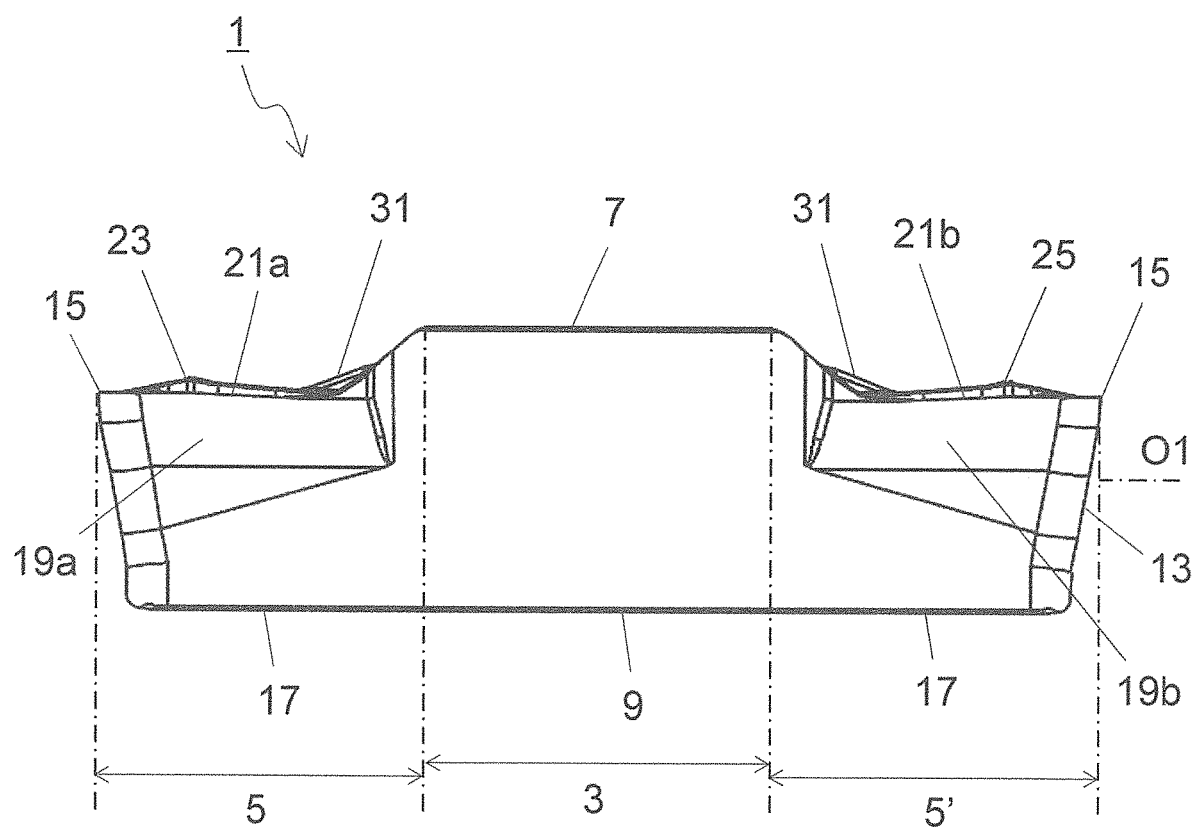
FIG. 5 is a side view when the cutting insert illustrated in FIG. 3 is viewed from B1 direction.

Although a size of the main body 3 is not particularly limited, a length thereof along the central axis O1 is settable to, for example, approximately 5-80 mm. A width of the main body 3 in a direction orthogonal to the central axis O1 (a vertical direction in FIG. 3) in a top view is settable to, for example, approximately 2-20 mm. A height of the main body 3 in a direction orthogonal to the central axis O1 (in a vertical direction in FIG. 5) in a side view is settable to, for example, approximately 2-15 mm.

The insert 1 needs at least one cutting part 5. The cutting parts 5 are located respectively one on the front end side and the rear end side of the main body 3 in the present embodiment. For the sake of convenience, the cutting part located on the rear end side bears reference "5'" in the drawings. The main body 3 and the cutting parts 5 may be formed separately or integrally. The main body 3 and the cutting parts 5 are formed integrally in the insert 1 of the present embodiment.

Although the main body 3 has the bar shape in the present embodiment, the shape of the main body 3 is not limited thereto. The main body 3 may have, for example, a planar shape, such as a triangular plate or a quadrangular plate. In cases where the main body 3 has the planar shape, the cutting parts 5 may be respectively located near corner parts of the main body 3. This makes it possible to obtain such a configuration that the insert 1 has three or four cutting parts 5.

For example, cemented carbide or cermet is usable as a material of the insert 1. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) or titanium nitride (TiN).

A surface of the insert 1 may be coated with a coating film by using chemical vapor deposition (CVD) method or physical vapor deposition (PVD) method. As a composition of the coating film, there are, for example, titanium carbide (TiC), titanium nitride (TiN), titanium carbonitride (TiCN), and alumina ($Al_2O_3$).

When a turning process is carried out using the insert 1 of the present embodiment, one of the two cutting parts 5 is used. Therefore, when using the cutting part 5' located closer to the rear end side than the main body 3, the insert 1 needs to be attached to the holder by reversing the front end side and the rear end side thereof. The cutting part 5 located closer to the front end side than the main body 3 has the same shape as the cutting part 5' located closer to the rear end side than the main body 3. Therefore, the cutting part 5 located closer to the front end side than the main body 3 is described in the following.

Figure 6:
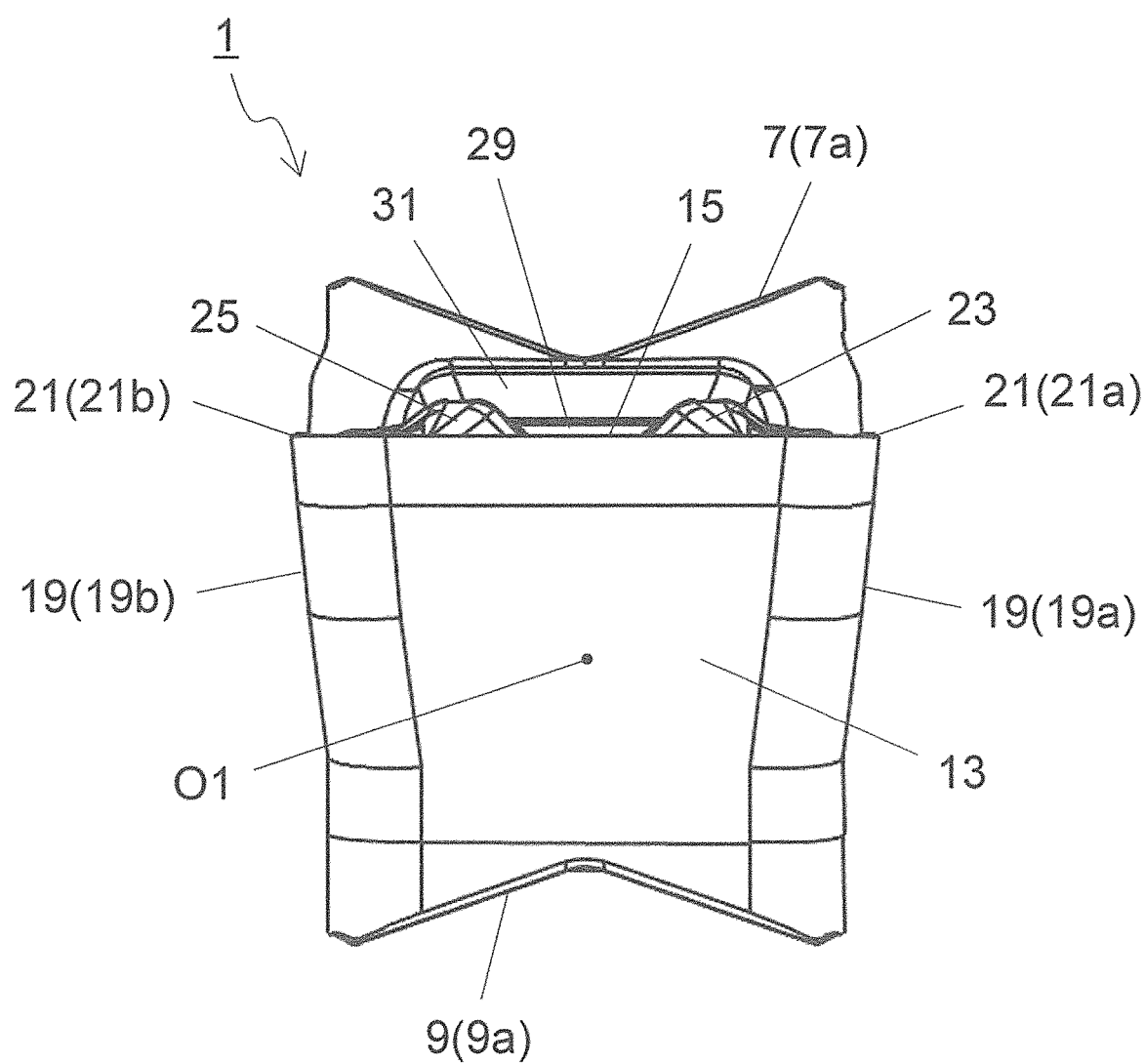
FIG. 6 is a front end view when the cutting insert illustrated in FIG. 4 is viewed from B2 direction.
Figure 7:
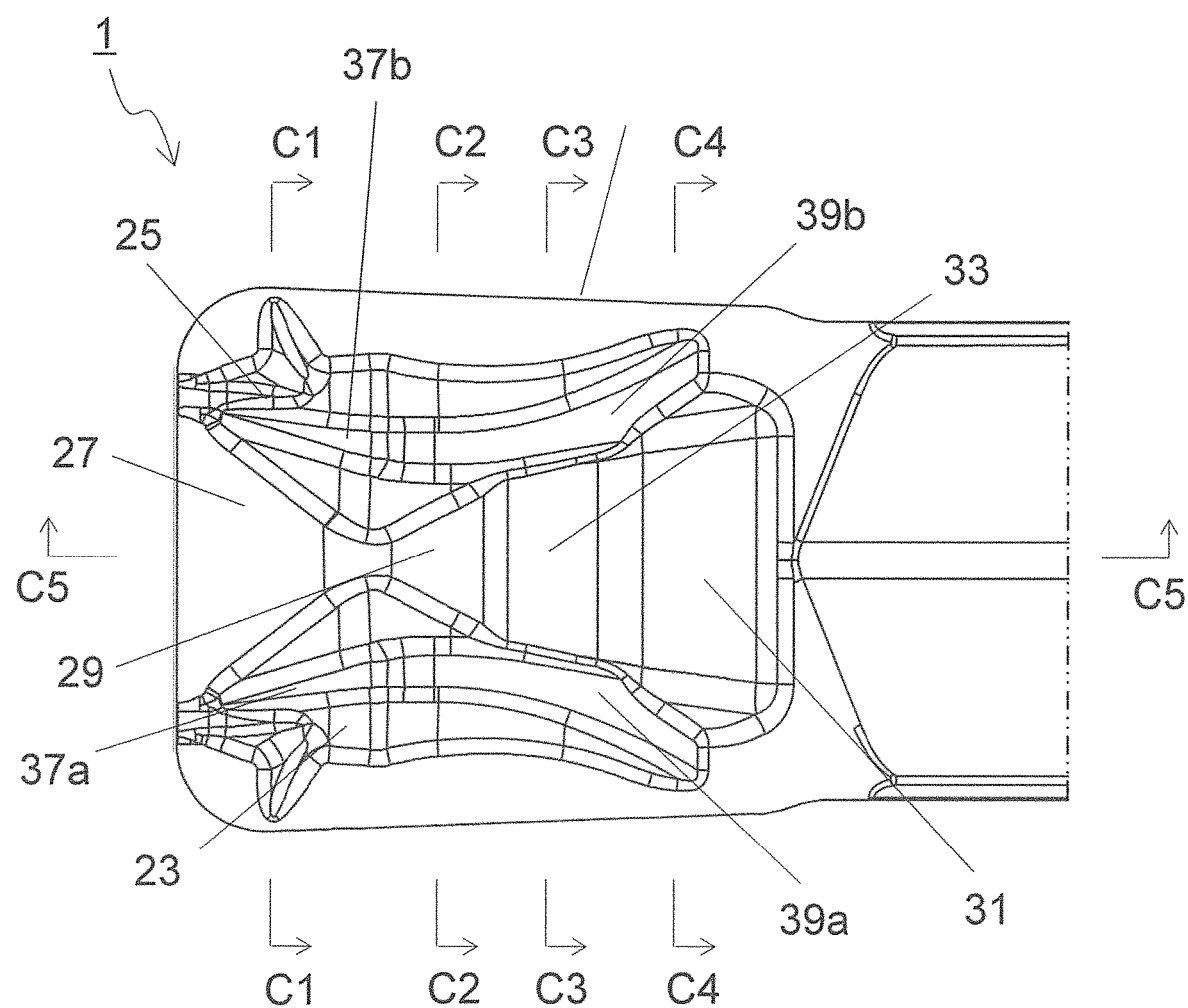
FIG. 7 is an enlarged view of the region A2 illustrated in FIG. 3.
Figure 8:
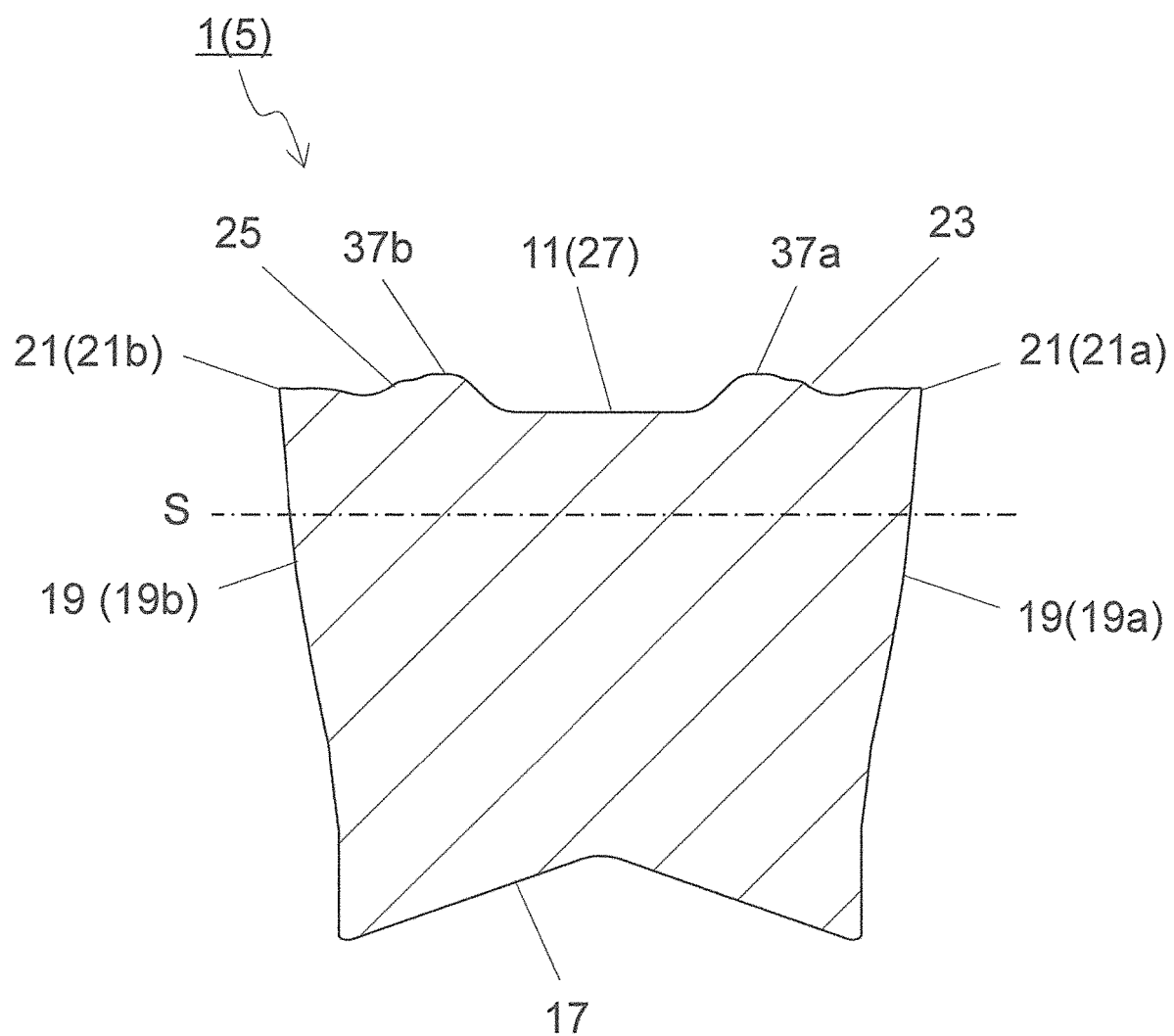
FIG. 8 is a sectional view taken along line C1-C1 illustrated in FIG. 7.
Figure 9:
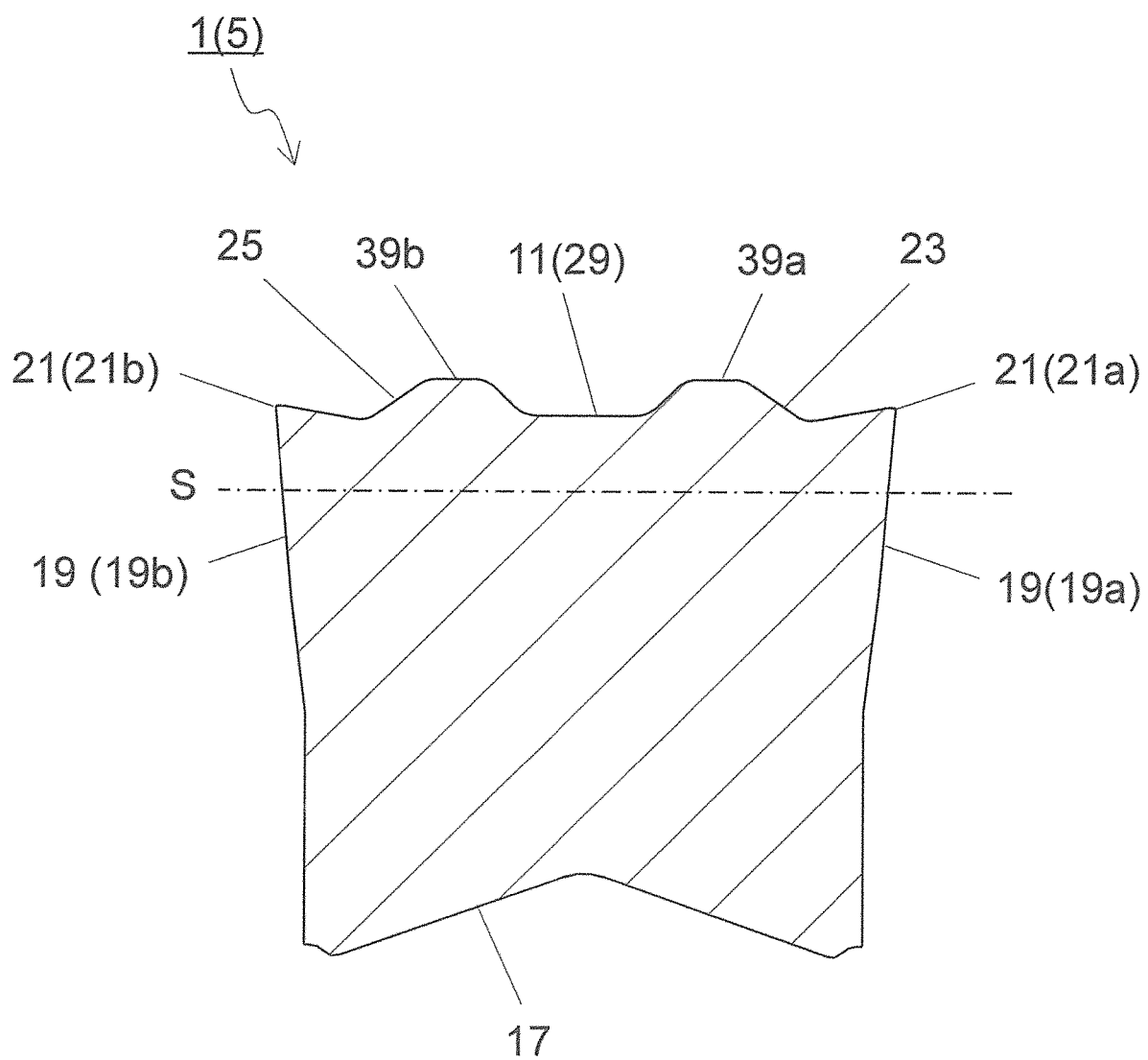
FIG. 9 is a sectional view taken along line C2-C2 illustrated in FIG. 7.
Figure 10:
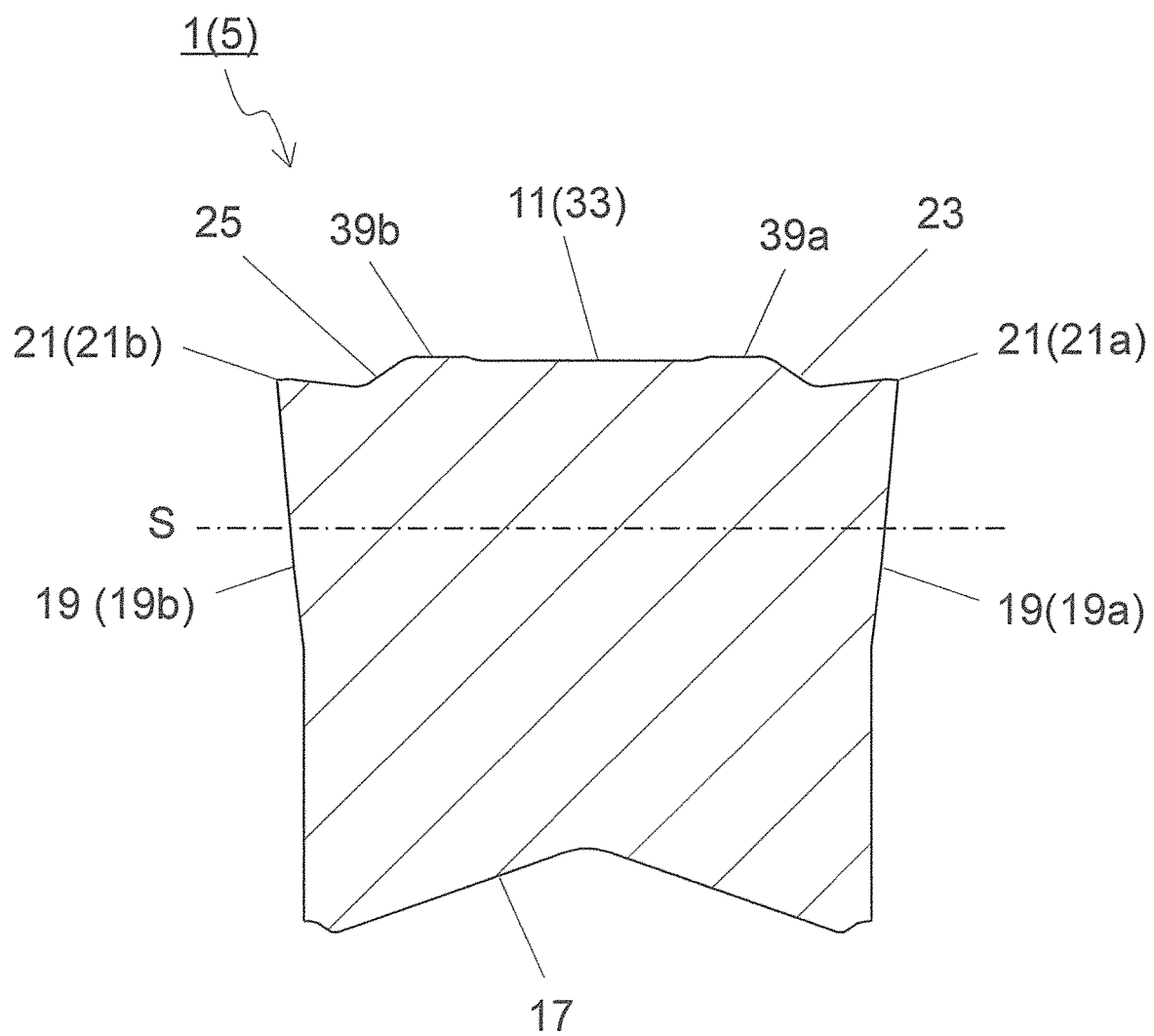
FIG. 10 is a sectional view taken along line C3-C3 illustrated in FIG. 7.
Figure 11:
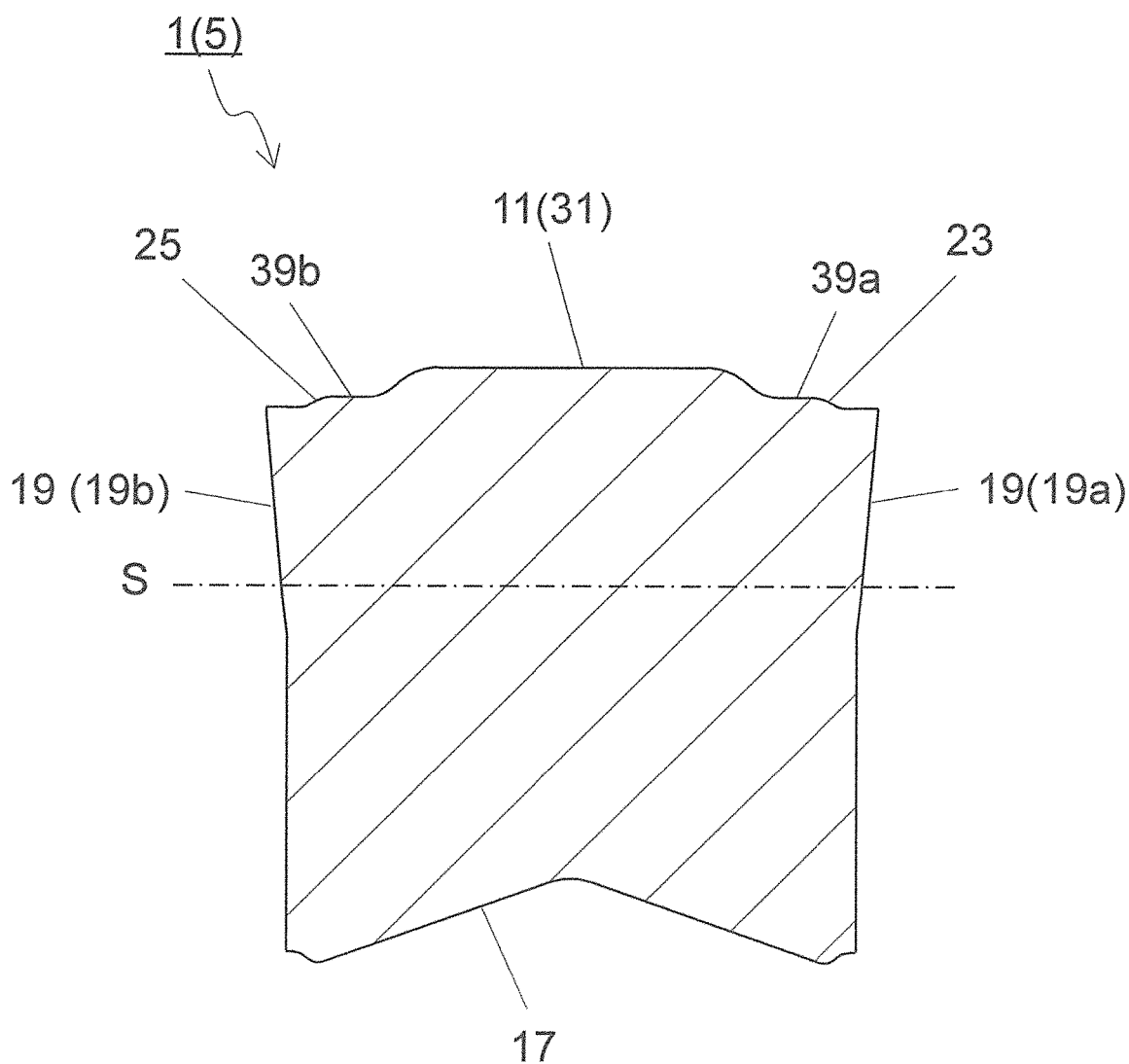
FIG. 11 is a sectional view taken along line C4-C4 illustrated in FIG. 7.

The cutting part 5 includes an upper surface 11, a front end surface 13, and a front cutting edge 15. In addition to these components, the cutting part 5 in the insert 1 of the present embodiment further includes a lower surface 17, a pair of side end surfaces 19 (19a, 19b), and a pair of side cutting edges 21 (21a, 21b) as illustrated in FIG. 6.

The upper surface 11 extends from the front end side to the rear end side. Specifically, the upper surface 11 has a rectangular shape whose long sides extend in the direction approximately along the central axis O1 in a top view. In other words, the upper surface 11 has the rectangular shape having two short sides and two long sides. Accordingly, one of the two short sides which is located on the front end side corresponds to an end portion of the insert 1 which is closer to the front end side. The other of the short sides of the upper surface 11 which is located on the rear end side corresponds to a boundary part between the cutting part 5 and the main body 3.

The upper surface 11 need not be a rectangular shape in a precise sense. The long sides and the short sides which constitute an outer peripheral edge of the rectangular shape need not be a straight line in a precise sense. Alternatively, a corner part where the long side intersects with the short side may be rounded.

Similarly to the upper surface 11, the lower surface 17 has a rectangular shape extending from the front end side toward the rear end side. The lower surface 17 in the present embodiment is somewhat smaller than the upper surface 11. An outer peripheral edge of the lower surface 17 is therefore invisible in a top view.

The front end surface 13 is adjacent to the short side located on the front end side on the upper surface 11, and is also adjacent to the lower surface 17. As illustrated in FIG. 6, the front end surface 13 has an approximately rectangular shape when viewed toward the front end surface 13, namely, in a front end view.

The pair of side end surfaces 19a and 19b are respectively adjacent to the pair of long sides on the upper surface 11, and are also adjacent to the lower surface 17. Because the corner part where the long side intersects with the short side on the upper surface 11 is rounded, a region where the front end surface 13 intersects with the pair of side end surfaces 19a and 19b is also rounded. The pair of side end surfaces 19a and 19b are therefore adjacent to the upper end surface 13 with the rounded region interposed therebetween.

In the present embodiment, because the lower surface 17 is smaller than the upper surface 11 as described above, the front end surface 13 and the pair of side end surfaces 19a and 19b are respectively inclined inward as going from the upper surface 11 to the lower surface 17. The front end surface 13 and the pair of side end surfaces 19a and 19b in the present embodiment function as a flank surface. The above inclination of the front end surface 13 and the pair of side end surfaces 19a and 19b makes it possible to ensure that the front end surface 13 and the pair of side end surfaces 19a and 19b are less likely to come into contact with a processing surface of a workpiece.

The central axis O1 in the insert 1 of the present embodiment is a straight line passing through a center of the front end surface 13 in the cutting part 5 and a center of an end surface in the cutting part 5' located opposite to the front end surface 13. The front end surface 13 has an approximately quadrangular shape in a front end view. Therefore, an intersection point of a straight line which passes through a center of a maximum width in the front end surface 13 and is perpendicular to the front cutting edge 15, and a straight line which passes through a center of a maximum height in the front end surface 13 and is parallel to the front cutting edge 15 may be regarded as the center of the front end surface 13.

Figure 4:
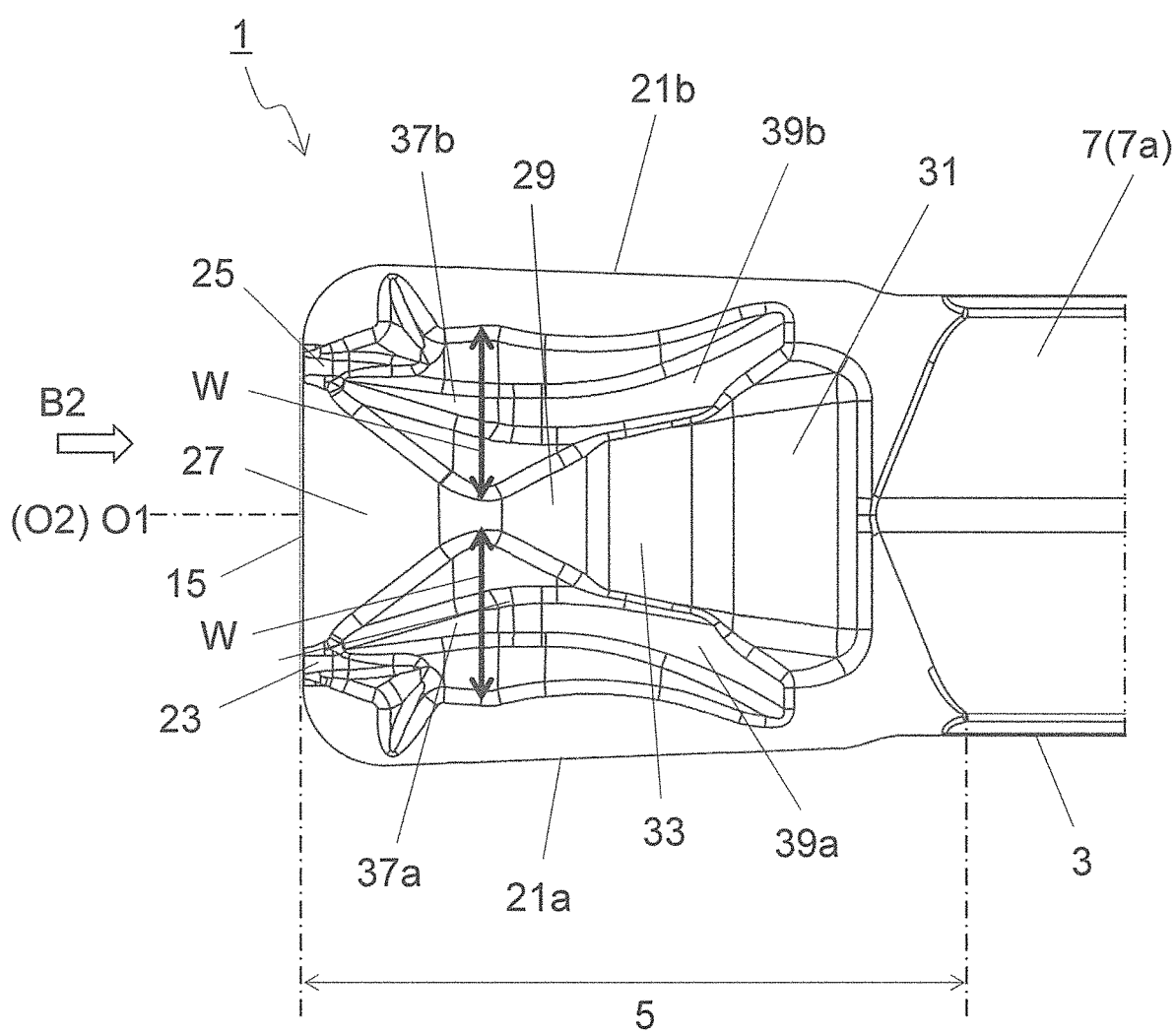
FIG. 4 is an enlarged view of a region A2 illustrated in FIG. 3.

In the present specification, the term "front end view" denotes viewing the insert 1 toward the front end surface 13 as illustrated in FIG. 6, specifically, denotes viewing the insert 1 in B2 direction in FIG. 4. The B2 direction illustrated in FIG. 4 is a direction along the central axis O1 and from the front end side toward the rear end side. The B2 direction in FIG. 4 is also a direction orthogonal to B1 direction in FIG. 3.

The front cutting edge 15 is located at an intersecting ridge of the upper surface 11 and the front end surface 13, namely, a ridge line where the upper surface 11 intersects with the front end surface 13. The front cutting edge 15 functions as a major cutting edge when carrying out a grooving process and a cutting-off process. The front cutting edge 15 in the present embodiment is located over the whole of an intersection part of the upper surface 11 and the front end surface 13.

The front cutting edge 15 in the present embodiment extends in a direction which is parallel to the lower surface 17 and orthogonal to the central axis O1. The front cutting edge 15 in the present embodiment is in the form of a straight line but is not necessarily limited thereto. For example, the front cutting edge 15 may be in the form of a partially curved line in a front end view.

The pair of side cutting edges 21a and 21b are located at an intersection part of the upper surface 11 and the pair of side end surfaces 19a and 19b, namely, a ridge line where the upper surface 11 intersects with the pair of side end surfaces 19a and 19b. The pair of side cutting edges 21a and 21b in the present embodiment are line symmetrical with reference to a perpendicular bisector O2 (refer to FIG. 4) of the front cutting edge 15 in a top view. Therefore, one of the pair of side cutting edges 21a and 21b is described in the following.

The side cutting edge 21 need not necessarily be formed over the whole intersection part of the upper surface 11 and the pair of side end surfaces 19a and 19b. The side cutting edge 21 is formed at a part of the intersection part of the upper surface 11 and the pair of side end surfaces 19a and 19b in the present embodiment. The side cutting edge 21 is usable for enhancing smoothness of an inner surface of a machined groove, or for increasing a width of a groove during the grooving process.

The side cutting edge 21 in the present embodiment is inclined so as to approach the perpendicular bisector O2 of the front cutting edge 15 as going from the front end side toward the rear end side in a top view. Consequently, the side cutting edge 21 is less likely to excessively interfere with the inner surface of the machined groove.

Although the side cutting edges 21a and 21b are respectively formed at the intersection parts of the upper surface 11 and the pair of side end surfaces 19a and 19b in the present embodiment, the configuration of the side cutting edge 21 is not limited thereto. For example, the side cutting edge 21 may be formed only at the intersection part of one of the pair of side end surfaces 19a and 19b and the upper surface 11. Alternatively, the side cutting edge 21 may be omitted.

A portion of the intersection part of the upper surface 11 and the front end surface 13, which is provided with at least the front cutting edge 15, is not in the form of a strict line resulting from an intersection of two surfaces. Similarly, a portion of the intersection part of the upper surface 11 and the pair of side end surfaces 19a and 19b, which is provided with at least the pair of side cutting edges 21a and 21b, is also not in the form of a strict line resulting from an intersection of two surfaces.

Alternatively, the part of the intersection part of the upper surface 11 and the side surface, which is provided with at least the front cutting edge 15 and the pair of side cutting edges 21a and 21b, may be in the form of a slightly curved surface. This makes it possible to improve durability of the cutting edges. The above-mentioned portions may be made into a curved surface shape by, for example, a so-called honing process.

The upper surface 11 in the present embodiment includes a first protrusion 23, a second protrusion 25, a first surface 27, a second surface 29, and a third surface 31. The first protrusion 23 and the second protrusion 25 respectively extend in a direction orthogonal to the front cutting edge 15 in a top view. The first protrusion 23 and the second protrusion 25 in the present embodiment are line symmetrical with respect to the perpendicular bisector O2 of the front cutting edge 15, and are disposed side by side in a top view.

As used herein, the phrase that "the first protrusion 23 and the second protrusion 25 respectively extend in a direction orthogonal to the front cutting edge 15" denotes that the first protrusion 23 and the second protrusion 25 respectively extend in a direction approximately orthogonal to the front cutting edge 15. In other words, the phrase that "the first protrusion 23 and the second protrusion 25 respectively extend in a direction orthogonal to the front cutting edge 15" is not limited to the configuration that the first protrusion 23 and the second protrusion 25 respectively extend straight and are strictly orthogonal to the front cutting edge 15. That is, the first protrusion 23 and the second protrusion 25 extend away from the front cutting edge 15. For example, the first protrusion 23 and the second protrusion 25 may be partially curved.

Here, a reference plane S parallel to the lower surface 17 is set as illustrated in FIGS. 8 to 12. The reference plane S is also settable as a plane parallel to the central axis O1 and the front cutting edge 15 in the present embodiment. The reference plane S may be used for evaluating vertical positions of constituent parts in the insert 1 of the present embodiment, as well as an inclination angle described later.

The first protrusion 23 and the second protrusion 25 are usable for directing chips generated by the front cutting edge 15 when the chips flow from the front end side toward the rear end side. An end portion on the front end side in each of the first protrusion 23 and the second protrusion 25 may connect to the front cutting edge 15 in order to stably direct the chips generated by the front cutting edge 15.

The first protrusion 23 and the second protrusion 25 in the present embodiment are respectively located away from the side end surface 19. This is for the purpose of ensuring a space that permits curving of chips generated by the side cutting edge 21 in between the side cutting edge 21 and each of the first protrusion 23 and the second protrusion 25. Although the first protrusion 23 and the second protrusion 25 are located away from the side end surface 19 in the present embodiment, their configuration is not limited thereto.

The first protrusion 23 and the second protrusion 25 in the present embodiment are located away from each other in a top view, and a space is provided between the first protrusion 23 and the second protrusion 25. More specifically, the first protrusion 23 and the second protrusion 25 are located side by side in a direction along the front cutting edge 15 in a top view. Therefore, the space is provided between the first protrusion 23 and the second protrusion 25 in the direction along the front cutting edge 15 in the top view. The first surface 27, the second surface 29, and the third surface 31 are located in the space in this order from the front end side. In other words, the first surface 27, the second surface 29, and the third surface 31 are located between the first protrusion 23 and the second protrusion 25 in the top view.

Figure 12:
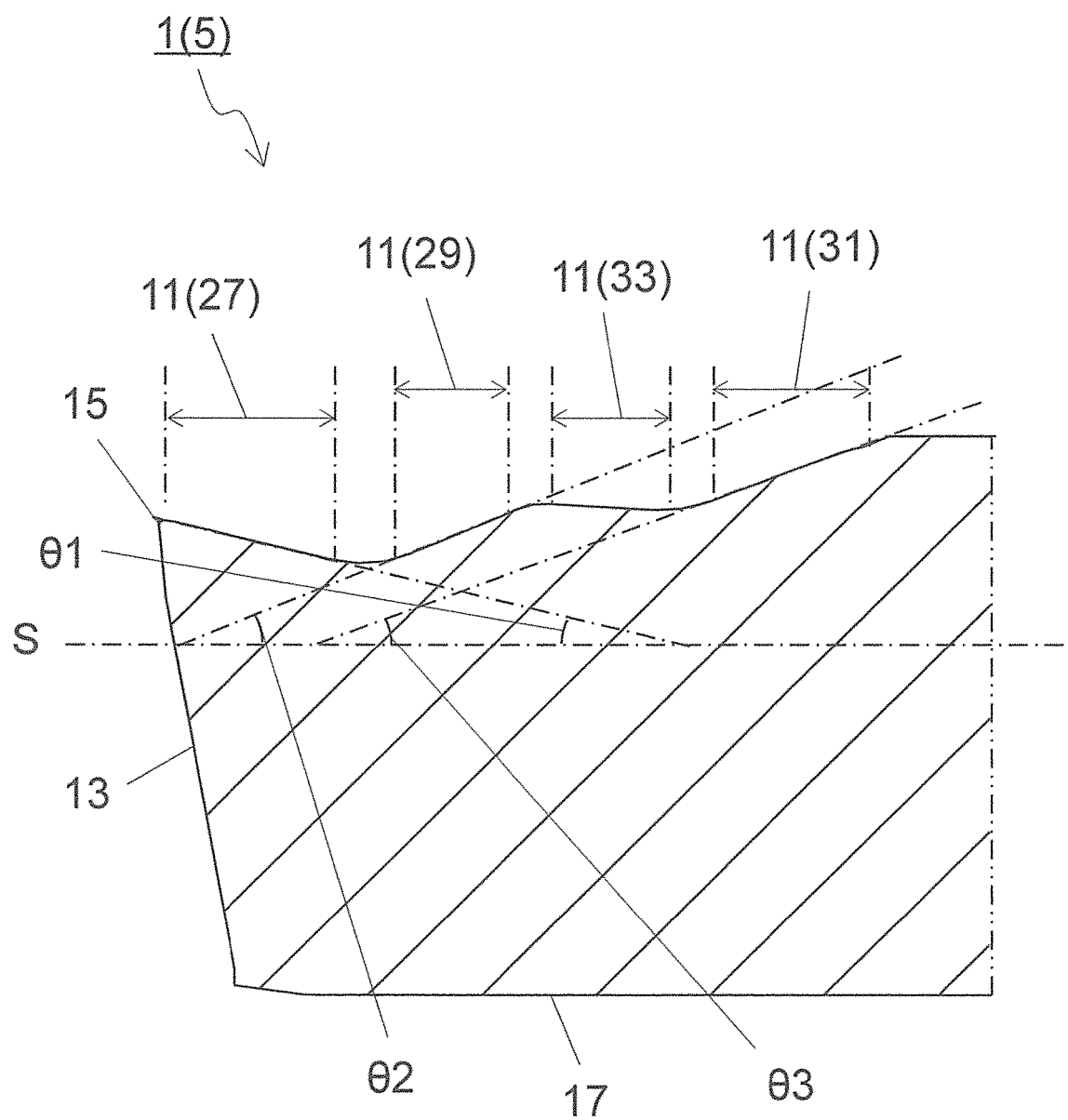
FIG. 12 is a sectional view taken along line C5-C5 illustrated in FIG. 7.

The following description is made with reference to FIG. 12. The first surface 27 is located along the front cutting edge 15 and inclined downward at a first inclination angle θ1 as going away from the front cutting edge 15. The first surface 27 performs a function as a so-called rake surface that scoops up chips generated by the front cutting edge 15.

The second surface 29 is a flat surface located more rearward than the first surface 27. The second surface 29 is inclined upward at a second inclination angle θ2 as going away from the front cutting edge 15. The third surface 31 is inclined upward at a third inclination angle θ3 as going away from the front cutting edge 15. The second surface 29 and the third surface 31 perform a function as a breaker wall which causes chips flowing along the first surface 27 to be curved in a spiral shape, and which divides the chips depending on the situation.

In the insert 1 of the present embodiment, the second surface 29 is located lower than an upper end of each of the first protrusion 23 and the second protrusion 25. The third surface 31 extends further upward than the upper end of each of the first protrusion 23 and the second protrusion 25. The third inclination angle θ3 of the third surface 31 is smaller than the second inclination angle θ2 of the second surface 29. The second surface 29 is located closer to the front cutting edge 15 than the third surface 31. Therefore, small chips having a small number of turns are apt to come into contact with the second surface 29. On this occasion, because the second inclination angle θ2 is larger than the third inclination angle θ3, the chips can be stably made into the spiral shape at the initial stage of a cutting process by the second surface 29 whose inclination angle is relatively large.

The third surface 31 is located further away from the front cutting edge 15 than the second surface 29. Hence, large chips having a large number of turns are apt to come into contact with the third surface 31. On this occasion, because the third inclination angle θ3 is smaller than the second inclination angle θ2, the chips can be stably made into the spiral shape by the third surface 31 whose inclination angle is relatively small. For these reasons, the chips can be treated stably.

Consequently, even when the number of turns is increased at the initial stage of the cutting process, the insert 1 is capable of stably making the chips into the spiral shape, thus leading to stable chip discharge performance during the cutting process.

Because the first surface 27 performs a function as the so-called rake surface, the first surface 27 need not be a flat surface, but may be, for example, a concave curved surface shape. In this case, a maximum value of an inclination angle on the first surface 27 is set to the first inclination angle θ1. An inclination angle of the first surface 27 in the present embodiment reaches a maximum value at the end portion on the front end side being continuous with the front cutting edge 15. Therefore, the inclination angle at the end portion on the front end side of the first surface 27 can be evaluated as the first inclination angle θ1.

Specific values of the first inclination angle θ1, the second inclination angle θ2, and the third inclination angle θ3 are not particularly limited. For example, the first inclination angle θ1 is settable to approximately 10-30°, the second inclination angle θ2 is settable to approximately 16-30°, and the third inclination angle θ3 is settable to approximately 15-29°.

The second surface 29 and the third surface 31 in the present embodiment have a flat planar shape. It is therefore possible to curve chips in the spiral shape by reducing excessive contact of the chips with the second surface 29 and the third surface 31. Thus, the insert 1 is less likely to wear, and chip clogging is less likely to occur.

As used herein, the phrase that "the second surface 29 and the third surface 32 have a planar surface" denotes that the second surface 29 and the third surface 31 are in the form of a straight line in each of three mutually vertical cross sections each passing through the second surface 29 and the third surface 31. Hereinafter, the phrase that another surface has a planar surface can be defined similarly.

Alternatively, the third surface 31 in the present embodiment may extend further rearward than a rear end of each of the first protrusion 23 and the second protrusion 25. In this case, chips coming from across the second surface 29 can be stably curved by the third surface 31.

The upper surface 11 in the present embodiment may further include a fourth surface 33 in addition to the first surface 27, the second surface 29, and the third surface 31. When the fourth surface 33 is located between the second surface 29 and the third surface 31, it is possible to bring the second surface 29 closer to the front cutting edge 15 without having any excessive inclination angle, or it is possible to bring the third surface 31 away from the front cutting edge 15 without having any excessive inclination angle. The chips can therefore be treated more stably in both when chips have a small number of turns and when chips have a large number of turns.

The fourth surface 33 in the present embodiment may be made into a flat surface. The fourth surface 33 may have a curved configuration. However, when the fourth surface 33 is the flat surface as in the case of the second surface 29 and the third surface 31, chip clogging is less likely to occur even when chips come into contact with the fourth surface 33.

Alternatively, the fourth surface 33 in the present embodiment may be the flat surface and located lower than the upper end of each of the first protrusion 23 and the second protrusion 25. In this case, the chips are less likely to come into strong contact with the fourth surface 33, thereby enhancing the effect of stably treating the chips by the second surface 29 and the third surface 31.

Still alternatively, the fourth surface 33 in the present embodiment may be a horizontal surface. Specifically, the fourth surface 33 may be a flat surface parallel to the lower surface 17 (the reference plane S) instead of being configured to incline upward or downward as going away from the front cutting edge 15. When the fourth surface 33 is so configured, the fourth surface 33 need not be configured to incline downward as going away from the front cutting edge 15. This makes it possible to increase a thickness of a region of the insert 1 which is located below the second surface 29 and the fourth surface 33, thus leading to enhanced durability of the second surface 29. Additionally, because the fourth surface 33 is not configured to incline upward as going away from the front cutting edge 15, chips coming from across the second surface 29 and then flowing toward the third surface 31 are less likely to come into contact with the fourth surface 33. Therefore, the chip clogging is much less likely to occur.

As used herein, the horizontal surface in the present embodiment need not be a strictly horizontal surface, but includes inclination of approximately ±5° with respect to the lower surface 17.

The first protrusion 23 and the second protrusion 25 may respectively include upper end surfaces 35 (35a and 35b) composed of flat surface. In other words, an upper end portion of each of the first protrusion 23 and the second protrusion 25 may be in the form of a straight line in a cross section which is orthogonal to the central axis O1 and intersects with the first protrusion 23 and the second protrusion 25. When the first protrusion 23 and the second protrusion 25 respectively have the flat upper end surfaces 35a and 35b, it is possible to more stably direct the chips generated by the front cutting edge 15.

Each of the upper end surfaces 35 may be composed of a single flat surface extending from an end on a front end side of the upper end surface 35 to an end on a rear end side thereof, or alternatively, made up of a plurality of flat surfaces. The upper end surfaces 35 in the present embodiment may be respectively made up of first upper end surfaces 37 (37a and 37b) and second upper end surfaces 39 (39a and 39b).

Each of the first upper end surfaces 37 is a flat surface that is inclined upward as going away from the front cutting edge 15. Each of the second upper end surfaces 39 is a flat surface which is located further rearward than the first upper end surface 37, and which is inclined downward as going away from the front cutting edge 15. Therefore, the first upper end surfaces 37 and the second upper surfaces 39 are respectively continuously disposed at front and rear positions and located in an intersecting manner.

With this configuration, the chips generated by the front cutting edge 15 can be directed more stably by the first upper end surfaces 37. Moreover, by disposing the second upper end surfaces 39 so configured, the space that permits curving of the chips can be ensured even when the number of turns is increased to make the chips larger.

A distance between the first upper end surfaces 37 in the first protrusion 23 and the second protrusion 25 may become smaller as going away from the front cutting edge 15 in a top view. In this case, a distance between the second upper end surfaces 39 located further rearward than the first upper end surfaces 37 in the first protrusion 23 and the second protrusion 25 may become at least partially larger as going away from the front cutting edge 15. With this configuration, the first upper end surfaces 37 have a relatively large distance between the first upper end surfaces 37 in the vicinity of the front cutting edge 15. Therefore, the chips generated by the front cutting edge 15 can be stably supported at two points with a large distance therebetween, thus making it possible to stably direct the chips by the first upper end surfaces 37. Even when the chips become larger, the chips can be smoothly curved by the second upper end surfaces 39. Consequently, the stable chip discharge performance can be provided at various stages in a cutting process, namely, from an initial stage of the process to a later stage of the process.

The first surface 27 is inclined downward as going away from the front cutting edge 15. The second surface 29 is inclined upward as going away from the front cutting edge 15. Thus, a chip flow direction is likely to change greatly at a boundary part between the first surface 27 and the second surface 29. Consequently, a load applied from the chips to the first protrusion 23 and the second protrusion 25 is likely to increase at the boundary part.

Figure 2:
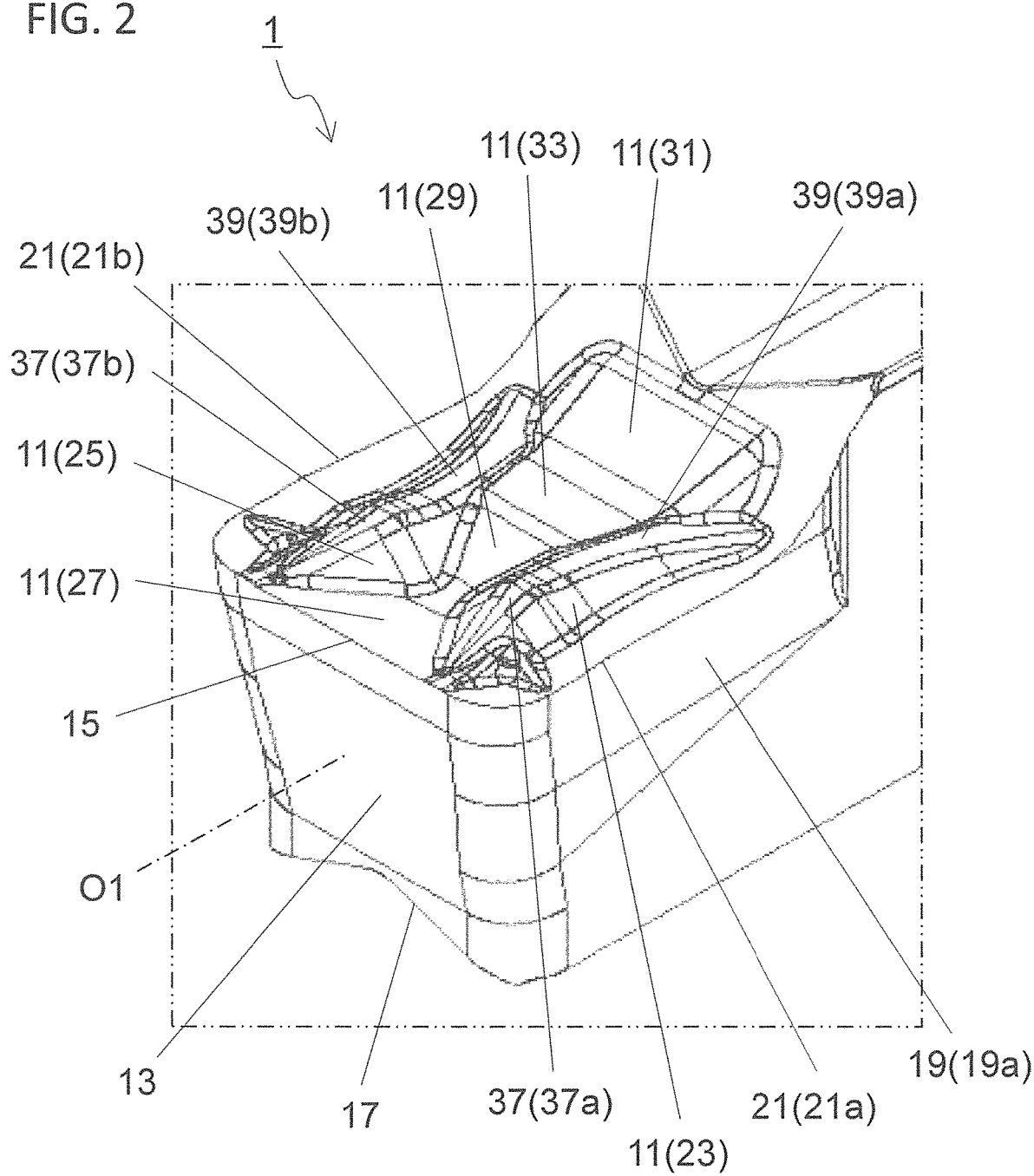
FIG. 2 is an enlarged view of a region A1 illustrated in FIG. 1.

As illustrated in FIG. 2, a width W of each of the first protrusion 23 and the second protrusion 25 in a direction parallel to the front cutting edge 15 may reach a maximum at a boundary part between the first surface 27 and the second surface 29 in a top view. When the width W reaches the maximum at a location to which a relatively large load tends to be applied, it is possible to enhance durability of the first protrusion 23 and the second protrusion 25.

A height of each of the first protrusion 23 and the second protrusion 25 may reach a maximum at the boundary part between the first surface 27 and the second surface 29. The chip flow can be directed stably when the height reaches the maximum at the location at which the chip flow direction is likely to change greatly.

As used herein, the height of the first protrusion 23 and the second protrusion 25 can also be defined as, for example, a height of each of the first protrusion 23 and the second protrusion 25 with respect to the lower surface 17 (reference plane S). Specifically, the height of the first protrusion 23 and the second protrusion 25 can be defined as a dimension from the lower surface 17 (reference plane S) to an upper end of each of the first protrusion 23 and the second protrusion 5.

Although the insert 1 of the embodiment has been described above with reference to the drawings, the insert 1 of the present disclosure is not limited to the configuration of the above embodiment, but includes modifications which do not depart from the gist of the present disclosure, and which are not particularly described in detail.

<Cutting Tool>

A cutting tool in one embodiment of the present disclosure is described below with reference to the drawings.

Figure 13:
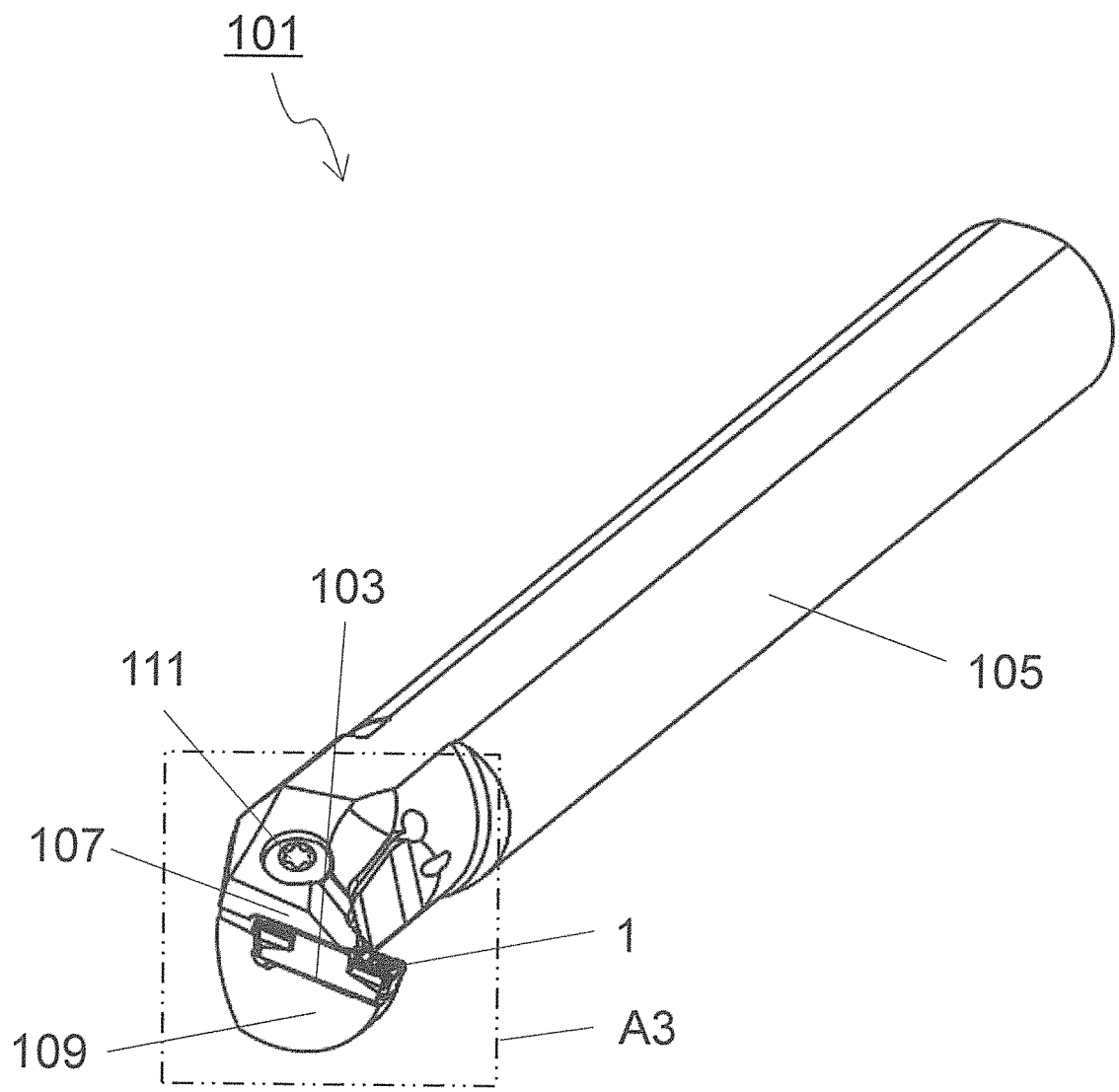
FIG. 13 is a perspective view illustrating a cutting tool in one embodiment of the present disclosure.
Figure 14:
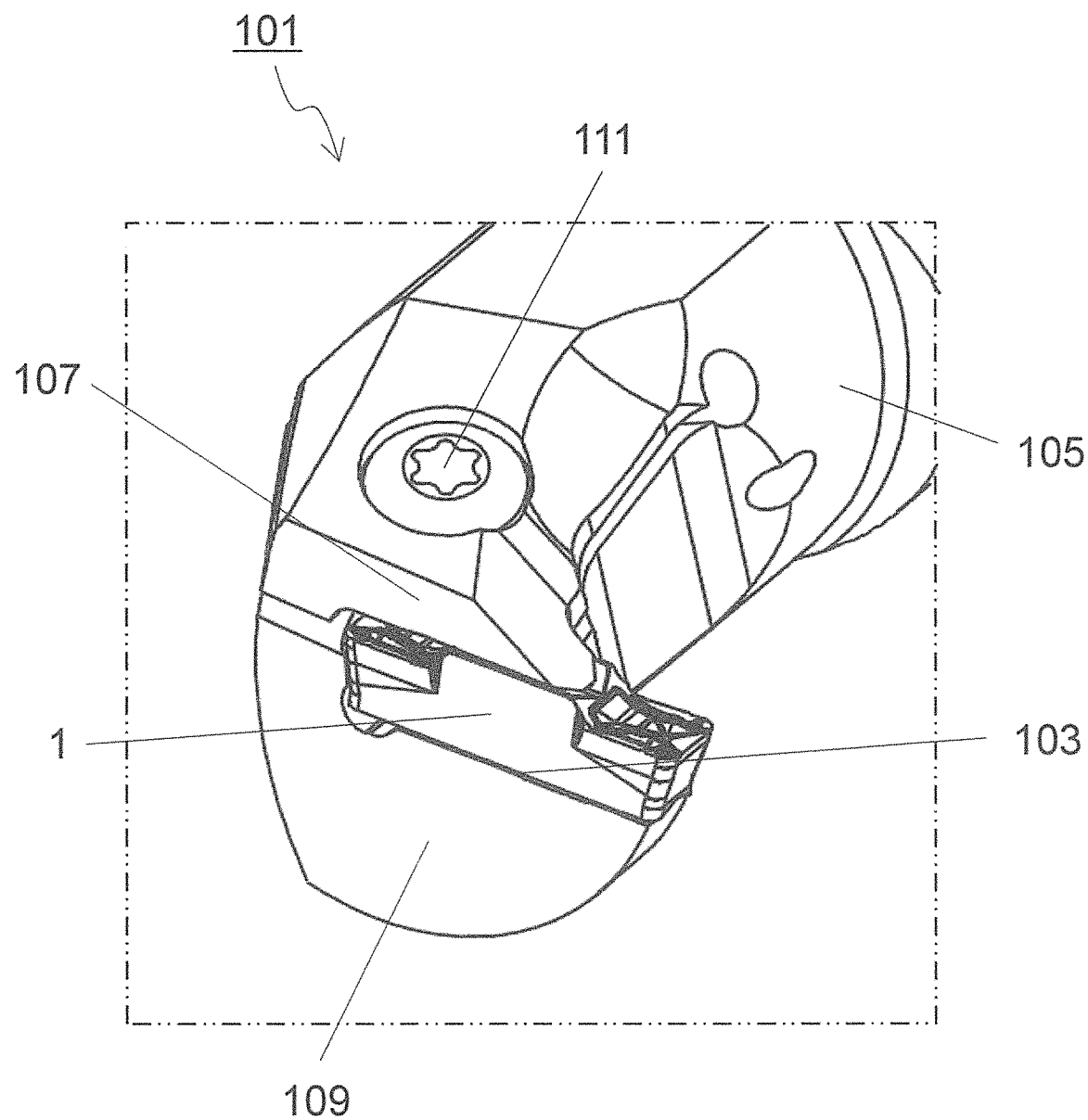
FIG. 14 is an enlarged view of a region A3 illustrated in FIG. 13.
Figure 15:
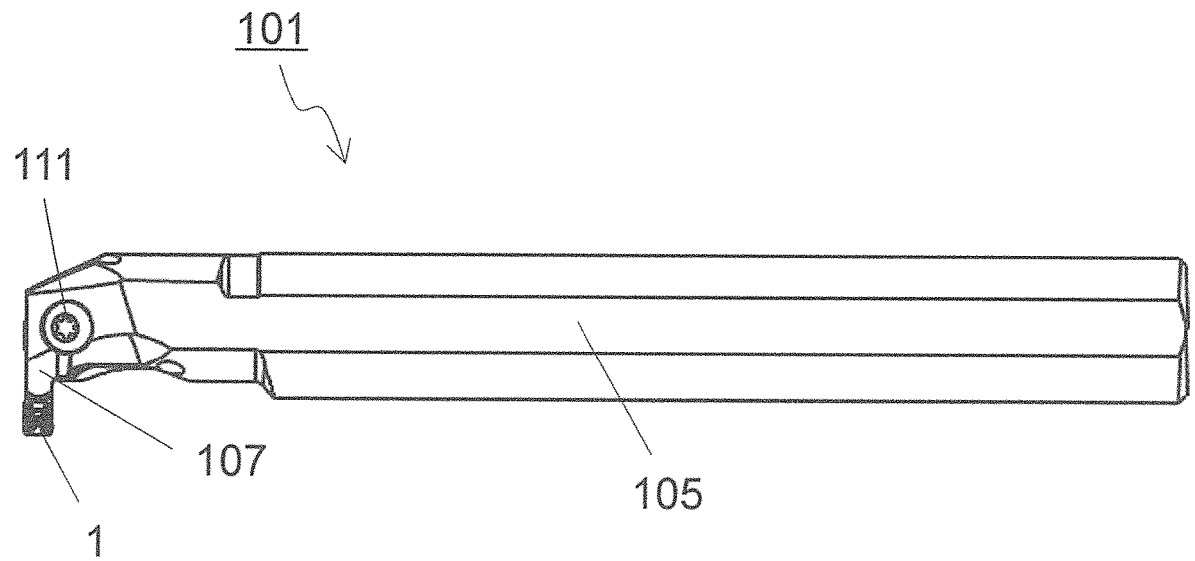
FIG. 15 is a top view of a cutting tool illustrated in FIG. 13.

The cutting tool 101 of the present embodiment includes a holder 105 and the cutting insert as illustrated in FIGS. 13 to 15. The holder 105 includes an insert pocket 103 (hereinafter also referred to simply as "the pocket 103") on a front end side thereof. The cutting insert is attached to the pocket 103 so that the front cutting edge protrudes outward from the front end side of the holder 105. In the present embodiment, the insert is attached to the pocket 103 so that the side cutting edge in addition to the front cutting edge protrudes outward from the front end side of the holder 105.

The holder 105 in the present embodiment has an elongated bar shape. An elongatedly extending direction coincides with a direction in which the central axis O1 extends in the insert. The single pocket 103 is provided on the front end side of the holder 105. The pocket 103 is designed to accept the insert and opens into the front end surface of the holder 105.

The holder 105 includes an upper jaw 107 and a lower jaw 109 at a front end portion thereof. The upper jaw 107 constrains the upper side surface of the main body in the insert. The lower jaw 109 constrains the lower side surface of the main body in the insert. The pocket 103 is formed by a region in which the upper jaw 107 is opposed to the lower jaw 109. The main body of the insert is insertedly fixed to the pocket 103, namely, the region between the upper jaw 107 and the lower jaw 109. Here, the upper side surface of the main body is brought into contact with the upper jaw 107 of the holder 105. The lower side surface of the main body is brought into contact with the lower jaw 109 of the holder 105.

Because the upper side surface of the main body includes the upper side groove, a region in the upper jaw 107 which is opposed to the lower jaw 109 is provided with a protrusion brought into contact with the upper side groove. Because the lower side surface of the main body includes the lower side groove, a region in the lower jaw 109 which is opposed to the upper jaw 107 is provided with a protrusion brought into contact with the lower side groove. The insert is stably fixable to the holder 105 by engagements of these protrusions with the upper side groove and the lower side groove of the insert.

The holder 105 in the present embodiment includes a first screw hole (not illustrated) formed in the upper jaw 107, and a second screw hole (not illustrated) formed below a screw hole in the lower jaw 109. The insert is fixable to the holder 105 by a fixing screw 111 designed to be inserted into these screw holes. Specifically, the fixing screw 111 is inserted into the first screw hole formed in the upper jaw 107, and a front end of the fixing screw 111 is inserted into the second screw hole formed in the lower jaw 109. The fixing screw 111 is then screwed into the first screw hole and the second screw hole.

For example, steel and cast iron are usable as the holder 105. Of these materials, high-rigidity steel is particularly preferable.

The cutting tool 101 of the present embodiment includes the above cutting insert and is therefore capable of providing stable chip discharge performance from the initial stage of the cutting process to a stage at which the number of turns becomes larger.

<Method of Manufacturing Machined Product>

A method of manufacturing a machined product in an embodiment of the present disclosure is described below with reference to the drawings.

The machined produce is manufacturable by subjecting a workpiece to a cutting process. The method of manufacturing the machined product in the present embodiment includes the following steps:

(1) rotating a workpiece 201;

(2) bringing the cutting edge of the cutting tool 101 represented by the above embodiment into contact with the workpiece 201 being rotated; and (3) moving the cutting tool 101 away from the workpiece 201.

Figure 16:
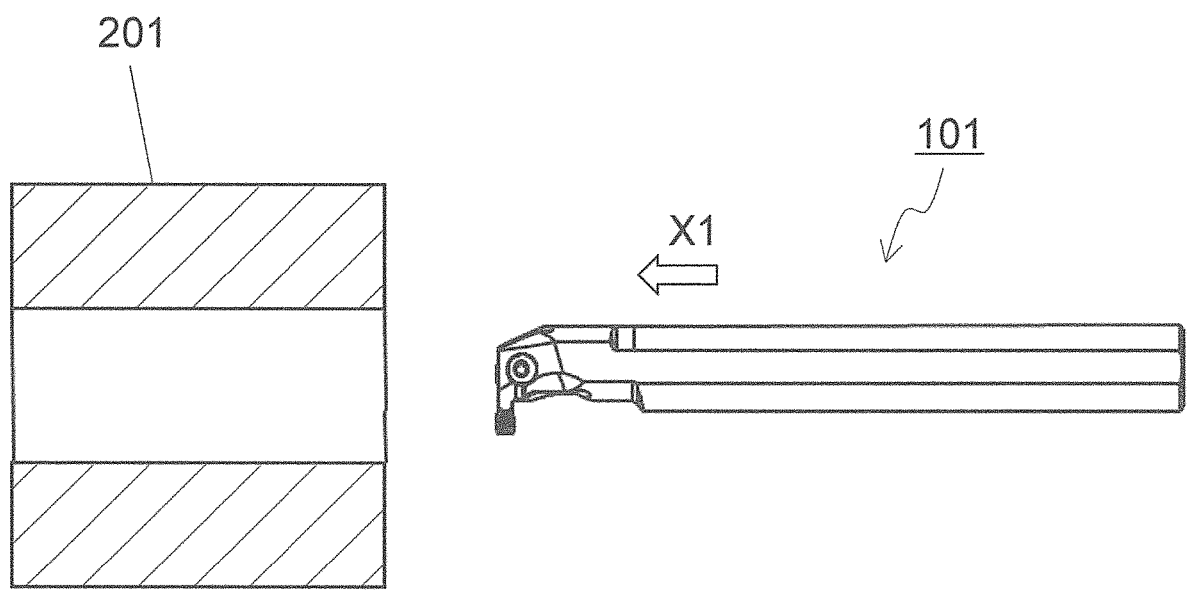
FIG. 16 is a schematic diagram illustrating a step in a method of manufacturing a machined product in an embodiment of the present disclosure.
Figure 17:
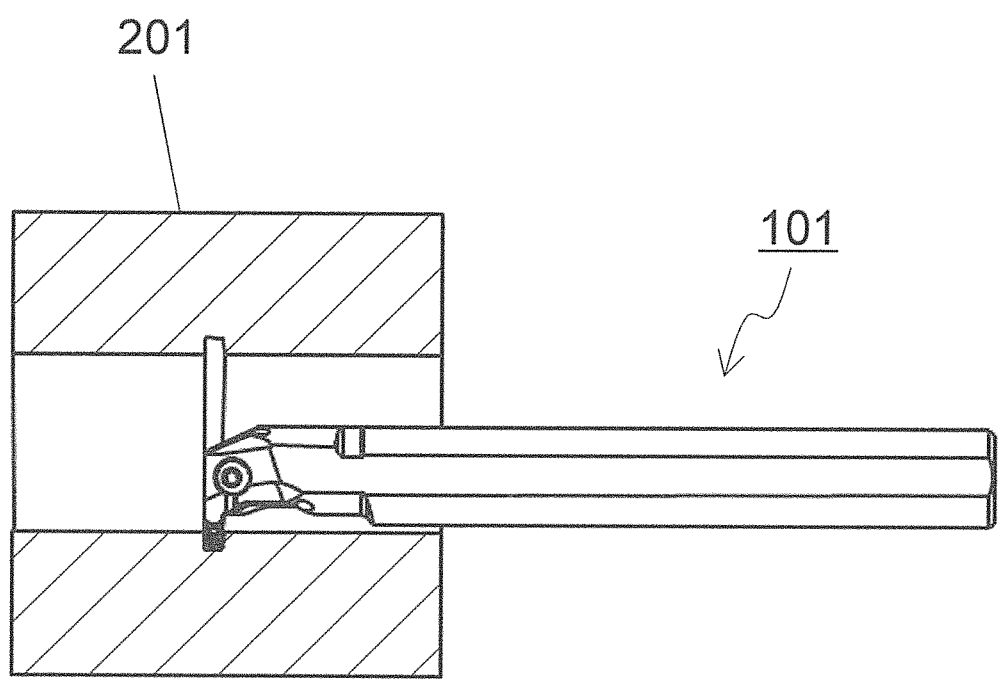
FIG. 17 is a schematic diagram illustrating a step in the method of manufacturing a machined product in the embodiment of the present disclosure.
Figure 18:
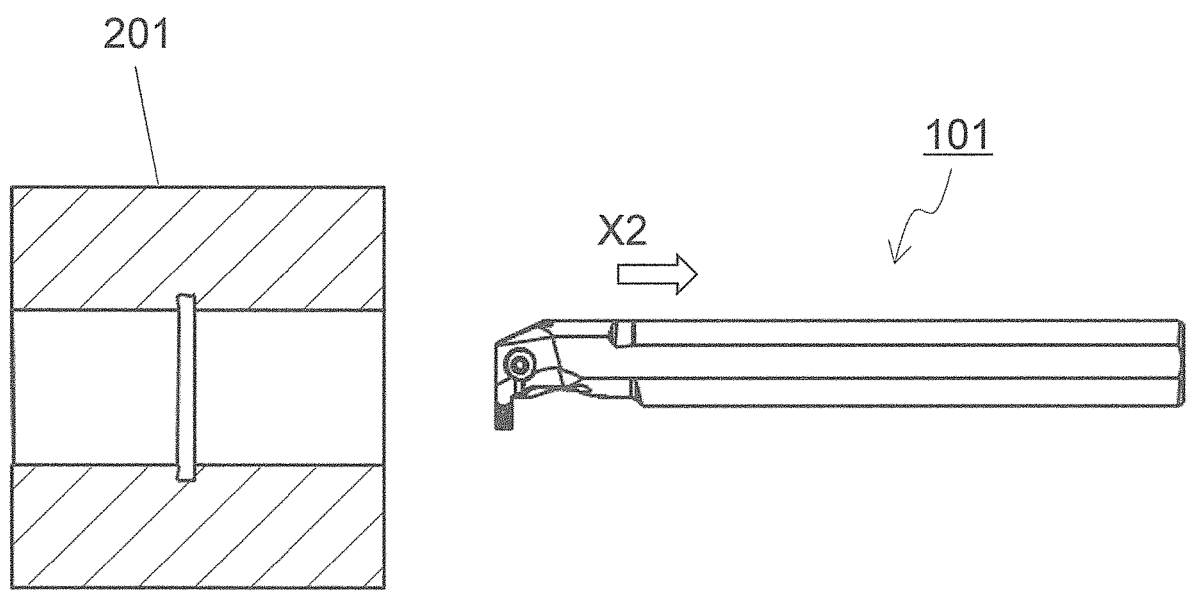
FIG. 18 is a schematic diagram illustrating a step in the method of manufacturing a machined product in the embodiment of the present disclosure.

More specifically, firstly, the workpiece 201 is rotated around an axis O2, and the cutting tool 101 is relatively brought near the workpiece 201 as illustrated in FIG. 16. Subsequently, the workpiece 201 is cut out by bringing the cutting edge in the cutting tool 101 into contact with the workpiece 201 being rotated as illustrated in FIG. 17. Thereafter, the cutting tool 101 is relatively moved away from the workpiece 201 as illustrated in FIG. 18.

With the method of manufacturing a machined product in the present embodiment, good machined surface accuracy is obtainable because the method uses the cutting tool that provides the stable chip discharge performance from the initial stage of the cutting process to the stage at which the number of turns becomes larger.

In the present embodiment, the cutting tool 101 is brought near the workpiece 201 by moving the cutting tool 101 in X1 direction in a state in which the axis O2 is fixed and the workpiece 201 is rotated. In FIG. 17, the workpiece 201 is cut out by bringing the cutting edge in the cutting insert 1 into contact with the workpiece 201 being rotated. In FIG. 18, the cutting tool is moved away by moving the cutting tool 101 in X2 direction in a state in which the workpiece 201 is rotated.

In the cutting process with the manufacturing method of the present embodiment, the cutting tool 101 is brought into contact with the workpiece 201, or the cutting tool 101 is moved away from the workpiece 201 by moving the cutting tool 101 in each of the steps. It is, of course, not intended to limit to this embodiment.

For example, in the step (1), the workpiece 201 may be brought near the cutting tool 101. Similarly, in the step (3), the workpiece 201 may be moved away from the cutting tool 101. When the cutting process is continued, it is necessary to repeat the step of bringing the cutting edge in the insert into contact with different portions of the workpiece 201, while keeping the workpiece 201 rotated.

Examples of the material of the workpiece 201 include carbon steel, alloy steel, stainless steel, cast iron, and nonferrous metals.

While the embodiments in the present disclosure have been described and illustrated above, the present disclosure is not limited thereto. It is, of course, possible to make any arbitrary ones insofar as they do not depart from the gist of the present disclosure.

For example, in the present embodiment, a concave curved surface, namely, a fillet surface may be located between the first surface 27 and the second surface 29, between the second surface 29 and the fourth surface 33, and between the fourth surface 33 and the third surface 31 as illustrated in FIG. 2. In other words, each of these surfaces may connect to another surface with the concave curved surface interposed therebetween. However, the configuration of connection parts of these surfaces is not limited thereto. For example, these surfaces may directly, smoothly connect to another surface.

DESCRIPTION OF REFERENCE NUMERALS 1 cutting insert (insert)
3 main body
5 cutting part
7 upper side surface
7a upper side groove
9 lower side surface
9a lower side groove
11 upper surface
13 front end surface
15 front cutting edge
17 lower surface
19, 19a, 19b side end surface
21, 21a, 21b side cutting edge
23 first protrusion
25 second protrusion
27 first surface
29 second surface
31 third surface
33 fourth surface
35 upper end surface
37, 37a, 37b first upper end surface
39, 39a, 39b second upper end surface
101 cutting tool
103 insert pocket (pocket)
105 holder
107 upper jaw
109 lower jaw
111 fixing screw
201 workpiece

What is claimed is:

1. A cutting insert, comprising:
an upper surface;
a front end surface adjacent to the upper surface; and
a front cutting edge located at an intersection part of the upper surface and the front end surface, wherein
the upper surface comprises a first protrusion and a second protrusion respectively extending in a direction orthogonal to the front cutting edge in a top view, and a first surface, a second surface, and a third surface, each of which is located between the first protrusion and the second protrusion in a direction along the front cutting edge in a top view, the first surface is located along the front cutting edge and inclined downward at a first inclination angle as going away from the front cutting edge, the second surface is a flat surface located further rearward than the first surface, and is inclined upward at a second inclination angle as going away from the front cutting edge, the third surface is a flat surface located further rearward than the second surface, and is inclined upward at a third inclination angle as going away from the front cutting edge, the second surface is located lower than an upper end of each of the first protrusion and the second protrusion, the third surface extends further upward than the upper end of each of the first protrusion and the second protrusion, the third inclination angle is smaller than the second inclination angle, each of the first protrusion and the second protrusion comprises an upper end surface composed of a flat surface, and the upper end surface comprises a flat-shaped first upper end surface inclined upward as going away from the front cutting edge, and a flat-shaped second upper end surface which is located further rearward than the first upper end surface and inclined downward as going away from the front cutting edge.

2. The cutting insert according to claim 1, wherein the third surface extends further rearward than a rear end of each of the first protrusion and the second protrusion.

3. The cutting insert according to claim 1, wherein a width of each of the first protrusion and the second protrusion in a direction parallel to the front cutting edge reaches a maximum at a boundary part between the first surface and the second surface in a top view.

4. The cutting insert according to claim 1, wherein a height of each of the first protrusion and the second protrusion reaches a maximum at a boundary part between the first surface and the second surface.

5. The cutting insert according to claim 1, wherein
the upper surface further comprises a fourth surface located between the second surface and the third surface, and
the fourth surface is located lower than the upper end of each of the first protrusion and the second protrusion.

6. The cutting insert according to claim 5, wherein the fourth surface is a flat surface.

7. The cutting insert according to claim 5, wherein the fourth surface is a horizontal surface.

8. The cutting insert according to claim 1, wherein a distance between the first upper end surface in the first protrusion and the first upper end surface in the second protrusion becomes smaller as going away from the front cutting edge, and a distance between the second upper end surface in the first protrusion and the second upper end surface in the second protrusion becomes larger as going away from the front cutting edge in a top view.

9. A cutting tool, comprising:
a holder comprising a pocket on a front end side; and
a cutting insert according to claim 1, the cutting insert being attached to the pocket so that the front cutting edge protrudes outward from the front end side of the holder.

10. A method of manufacturing a machined product, comprising:
rotating a workpiece;
bringing the front cutting edge in a cutting tool according to claim 9 into contact with the workpiece being rotated; and
moving the cutting tool away from the workpiece.

11. A cutting insert, comprising:
an upper surface;
a front end surface adjacent to the upper surface; and
a front cutting edge located at an intersection part of the upper surface and the front end surface, wherein
the upper surface comprises a first protrusion and a second protrusion respectively extending in a direction orthogonal to the front cutting edge in a top view, and a first surface, a second surface, and a third surface, each of which is located between the first protrusion and the second protrusion in a direction along the front cutting edge in a top view, the first surface is located along the front cutting edge and inclined downward at a first inclination angle as going away from the front cutting edge, the second surface is a flat surface located further rearward than the first surface, and is inclined upward at a second inclination angle as going away from the front cutting edge, the third surface is a flat surface located further rearward than the second surface, and is inclined upward at a third inclination angle as going away from the front cutting edge, the second surface is located lower than an upper end of each of the first protrusion and the second protrusion, the third surface extends further upward than the upper end of each of the first protrusion and the second protrusion, the third surface comprises:
a first end located closest to the front cutting edge, and
a second end located furthest from the front cutting edge, the first end is located between the first protrusion and the second protrusion, the second end is located further rearward than the first protrusion and the second protrusion, and the third inclination angle is smaller than the second inclination angle.

12. The cutting insert according to claim 11, wherein each of the first protrusion and the second protrusion comprises an upper end surface composed of a flat surface.

13. The cutting insert according to claim 12, wherein the upper end surface comprises a flat-shaped first upper end surface inclined upward as going away from the front cutting edge, and a flat-shaped second upper end surface which is located further rearward than the first upper end surface and inclined downward as going away from the front cutting edge.

14. The cutting insert according to claim 13, wherein a distance between the first upper end surface in the first protrusion and the first upper end surface in the second protrusion becomes smaller as going away from the front cutting edge, and a distance between the second upper end surface in the first protrusion and the second upper end surface in the second protrusion becomes larger as going away from the front cutting edge in a top view.

15. The cutting insert according to claim 11, wherein the third surface extends further rearward than a rear end of each of the first protrusion and the second protrusion.

16. The cutting insert according to claim 11, wherein a width of each of the first protrusion and the second protrusion in a direction parallel to the front cutting edge reaches a maximum at a boundary part between the first surface and the second surface in a top view.

17. The cutting insert according to claim 11, wherein a height of each of the first protrusion and the second protrusion reaches a maximum at a boundary part between the first surface and the second surface.

18. The cutting insert according to claim 11, wherein
   the upper surface further comprises a fourth surface located between the second surface and the third surface, and
   the fourth surface is located lower than the upper end of each of the first protrusion and the second protrusion.

19. The cutting insert according to claim 18, wherein the fourth surface is a flat surface.

20. The cutting insert according to claim 18, wherein the fourth surface is a horizontal surface.

* * * * *